Dec. 29, 1959   R. A. GAISER   2,919,212
ELECTRICALLY CONDUCTING GLASS AND METHOD FOR PRODUCING SAME
Filed July 13, 1955
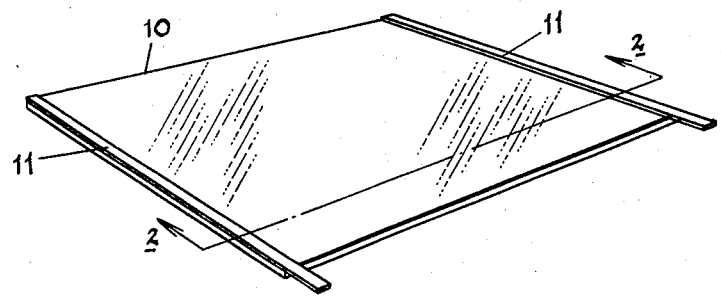
Fig. 1
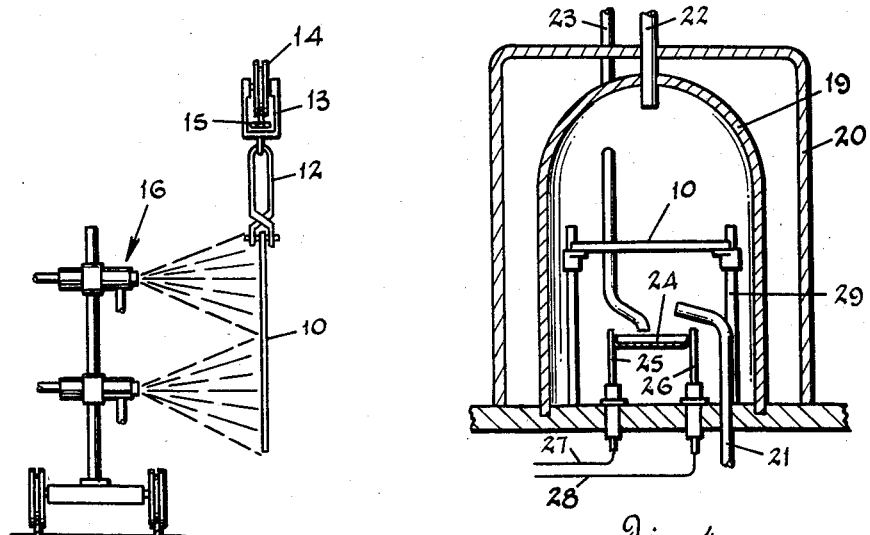
Fig. 3
Fig. 4
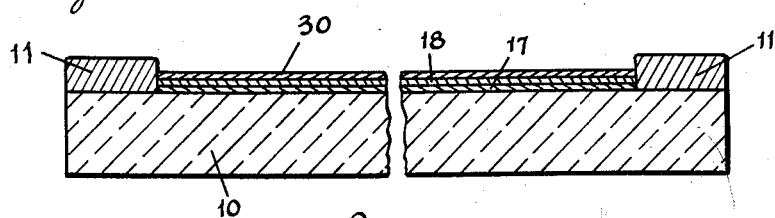
Fig. 2
INVENTOR.
Romey A. Gaiser
BY
Nobbe & Swope
ATTORNEYS United States Patent Office 2,919,212
Patented Dec. 29, 1959

2,919,212

ELECTRICALLY CONDUCTING GLASS AND METHOD FOR PRODUCING SAME

Romey A. Gaiser, Toledo, Ohio, assignor to Libbey-Owens-Ford Glass Company, Toledo, Ohio, a corporation of Ohio Application July 13, 1955, Serial No. 521,692

11 Claims. (Cl. 117—215)

The present invention relates broadly to electrically conducting glass of the type made up of a sheet of glass having a transparent, electrically conducting film on a surface thereof. More particularly it has to do with an article of the above general character in which the electrically conducting film is resistant to hydrogen sulfide, and which is particularly adapted to use with luminescent panels.

Electrically conducting films composed of materials such as tin oxide are well known and have found a number of important commercial uses. These tin oxide films as ordinarily produced have been proven very satisfactory for most purposes, but it has been found that such films are attacked by hydrogen sulfide at elevated temperatures and their electrical properties are destroyed. Because one of the methods of making luminescent panels, and particularly transparent electroluminescent panels, involves subjecting the material to which the luminescent phosphor is applied to an atmosphere of hydrogen sulfide at elevated temperatures, it is desirable, where the phosphors are applied to a filmed panel to provide a film which is resistant to attack by hydrogen sulfide.

An important object of this invention is to provide an electrically conducting film which is resistant to attack by hydrogen sulfide.

Another object of this invention is to provide a method of making electroluminescent panels including an electrically conducting film of the above character and an electroluminescent phosphor.

A further object of this invention is to provide such luminescent panel including, a transparent electrically conducting film, characterized by the fact that it has a low electrical resistance, and luminescent materials.

A still further object of this invention is to provide a method of making a transparent, electroluminescent panel comprising tin oxide and a luminescent screen.

Further objects and advantages of the invention will become more apparent during the course of the following description when taken in connection with the accompanying drawings.

In the drawings, wherein like numerals are employed to designate like parts throughout the same:

Fig. 1 is a perspective view of a sheet of glass provided with the films of this invention;

Fig. 2 is a fragmentary sectional view taken substantially along the line 2—2 of Fig. 1;

Fig. 3 is a diagrammatic view of one form of apparatus for applying a film or coating to the heated sheet; and Fig. 4 is a diagrammatic sectional view of an apparatus for applying a luminescent phosphor to form a luminescent screen on the filmed sheet.

In order to render a sheet of glass electrically conducting, it is customary to provide such a sheet, designated 10 in Fig. 1, with suitable electrodes 11 positioned along opposite margins of the sheet. Electrodes of sprayed copper, sprayed copper alloys, gold, silver and platinum fluxes have all been used satisfactorily. With electrodes in place, the sheet 10 is hung from tongs 12 suspended from a carriage 13 provided with wheels 14 running on a monorail 15. In this way the sheet is passed into and through a tunnel type furnace within which it is heated to substantially its point of softening. After the sheet 10 has reached the required temperature it is conveyed from the furnace and brought into filming position as shown in Fig. 3 where it is uniformly sprayed over its entire surface with a filming liquid such, for example, as a solution of tin halide, from the spray guns 16.

The tin halide, for example stannic tetrachloride, reacts with the hot glass to leave a thin, transparent, tightly adherent, electrically conducting coating 17 on the glass; and as can be seen in Fig. 2, the film covers the entire surface of the glass between the electrodes 11 and is in electrical contact with the electrodes. It is to be understood that other methods of applying the tin oxide film may be employed and that suitable tin compounds other than tin tetrachloride may be used.

According to the invention, after the tin oxide film has been applied, a sulfide resistant transparent coating 18 is applied on top of the tin oxide coating 17. I have found that when such a coating is applied it acts as a barrier to the injurious action of hydrogen sulfide. In general, any sulfide resistant film which is transparent and does not greatly affect the electrical properties of the tin oxide film may be used. For example, titanium oxide, silicon dioxide and chromium oxide coatings have been found to be satisfactory for this purpose and may be applied by the following procedure.

The titanium oxide coating can be deposited from the vapors of titanium tetrachloride or by spraying with various titanium organic compounds. The procedure is similar to that used for applying the tin oxide film, and a similar apparatus is used. The glass is again passed into and through a tunnel type furnace in which it is heated to substantially its point of softening, and then brought into filming position adjacent a spraying apparatus similar to the one shown in Fig. 3. It is uniformly sprayed over its entire surface with a solution of a suitable titanium compound such as titanium tetrachloride or organic titanates from the spray guns to form a titanium oxide coating over the tin oxide film.

Chromium oxide coatings can be produced over the tin oxide film by spraying an 11% solution by volume of chromium oxychloride ($CrO_2Cl_2$) dissolved in glacial acetic acid using the procedure set forth for applying a titanium oxide coating. Similarly silicon dioxide may be applied by spraying a solution of silicon tetrachloride or suitable organic silicon compounds on a heated surface.

It is to be understood that other procedures and ingredients may be used to apply a titanium oxide, silicon dioxide or chromium oxide coating and that the above procedures are illustrative only and not intended to limit the scope of the invention.

The resulting transparent, electrically conducting film with the protective coating applied thereon has the advantages of a tin oxide film and further the ability to withstand attack by hydrogen sulfide. It has been found that tin oxide films are destroyed when exposed to an atmosphere of hydrogen sulfide gas for a period of one hour at a temperature of 200° C.

In contrast to this a film of tin oxide which had a chromium oxide film applied thereover showed little visible change when exposed to an atmosphere of hydrogen sulfide gas for one hour at a temperature of 200° C. Moreover, the electrical resistance of the film which was 60,000 ohms per square remained substantially unchanged being 60,000 ohms before exposure and 60,000 ohms after exposure.

Tests were made which demonstrate the fact that the titanium oxide coating protects the tin oxide film from the adverse effect of hydrogen sulfide and the results are shown in tabular form as follows:

Table

| °C. | $R_o$ | $R_e$ | $R_t$ | $R_{te}$ |
|---|---|---|---|---|
| 100 | 1,800 | 1,800 | | |
| 150 | 900 | 1,500 | | |
| 200 | 625 | 8,000 | | |
| 250 | 550 | 25,000,000 | | |
| 300 | 1,000 | Very high | | |
| 250 | 625 | | 625 | 900 |
| 300 | 650 | | 625 | 2,200 |
| 400 | 750 | | 750 | 1,100 |
| 500 | 700 | | 720 | 700 |
| 600 | 900 | | 900 | 1,000,000 |

In the table $R_o$ is the resistance of the tin oxide film, $R_e$ is the resistance of the tin oxide film after exposure to hydrogen sulfide for ½ hour at the temperature shown in the first column, $R_t$ is the resistance of the tin oxide film having a coating of titanium oxide applied thereover, and $R_{te}$ is the resistance of the tin oxide film having a titanium oxide coating after exposure to hydrogen sulfide for ½ hour at the temperature shown in the first column. All resistances are given in ohms per square.

It is noteworthy that the titanium oxide coating had substantially no effect on the resistance of the tin oxide film. Also, the superiority of such coated films is graphically illustrated in the table, by a comparison of the effect of hydrogen sulfide on the unprotected film with the effect on the protected film. Further it has been found that tin oxide films that have been coated with titanium oxide have successfully withstood attack by an atmosphere of hydrogen sulfide for ½ hour at temperatures of 400° C. and 500° C. At 600° C., at which the glass softens, the titanium oxide coated film showed an increase from 900 ohms to 1,000,000 ohms, which is still less than the change of resistance of tin oxide alone at 250° C. in a similar atmosphere.

It is contemplated that such films may be used to advantage in areas where concentrations of hydrogen sulfide are present in the atmosphere and particularly when the film is to be heated to elevated temperatures during use. Also the film of this invention has certain specific applications such as in the production of an electrically conducting film having a luminescent screen.

The luminescent screen may be applied by any of the well known methods of depositing such a screen on a flat surface. The use of the electrically conducting film of this invention has proved particularly advantageous when applying the luminescent screen in the presence of hydrogen sulfide at elevated temperatures.

An apparatus for the deposition of such a screen is illustrated in Fig. 4 in which there is shown a treating chamber 19 surrounded by a furnace 20. The heating chamber 19 has a gas supply tube 21, evacuation tube 22, and a solid material introduced through tube 23. Near the lower end of chamber 19 there is located a vaporizer 24 adapted to receive material from the conduit 23. The vaporizer 24 is resistance heated by electrical energy which is supplied to the terminals 25 and 26 through lead wires 27 and 28. The sheet 10 is placed on support 29 in inverted position so that the film 17 and coating 18 is on the lower side thereof. In order to apply the luminescent screen, the chamber 19 is heated to a temperature of about 400° C. to 600° C., and the vaporizer 24 is heated to above the vaporizing temperature of the substance used while the solid material is introduced through the conduit 23. At the same time, hydrogen sulfide or hydrogen solenide gas is introduced through the tube 21, the end of which is so located that the gas intermingles and mixes with the vapors of the material added to the vaporizer 24 and reacts therewith to form on the glass sheet 10 a condensed, continuous, transparent, luminescent screen. During the formation of the screen 30, the chamber is continuously evacuated through the tube 22. The luminescent screen 30 is made any thickness desired simply by varying the time of treatment.

The solid materials which may be introduced into the vaporizer 24 may be any metals or metal salts or mixtures thereof which can be vaporized to provide the desired materials through reaction with the hydrogen sulfide or selenide to produce the luminescent screen. For example, zinc chloride which has a boiling point of 732° C. may be used, and in this case the vaporizer 24 is maintained at a temperature above 732° C. At the vapors of the zinc chloride rise upwardly they intermingle with the hydrogen sulfide and react thereith producing on the plate a continuous, transparent film which upon analysis is shown to be ZnS:Zn. Cadmium sulfide or selenide phosphors may also be used and they are prepared in the same manner as those of zinc sulfide or selenide. Suitable activator may also be added to the phosphors by any of the methods known to those skilled in the art.

The electroluminescent panels of this invention may be used in such articles as television screens, fluorescent lights, and the like where the luminescent material is activated by cathode rays or the like. The panels may also be placed near a second electrically conducting film, and the phosphors excited by a field. It has been found that ultraviolet excitation is increased up to 50 times in such a field. In all of these and other applications, the transparent character of the electroluminescent panel is particularly valuable in both eliminating the effects of diffused light and in providing a transparent article.

The resulting transparent electroluminescent panel of this invention therefore has the advantages which are achieved by using the transparent tin oxide electrically conducting film. However, it is contemplated that the electrically conducting luminescent panel may be formed without tin oxide, if desired, and that the luminescent screen be applied directly to the sulfide resistant coating which has been applied directly to the glass plate. When titanium oxide films are applied to glass plates or sheets, the electrical resistance of such a film is generally too high to consider the film an electrically conducting film. However, it has been found that when such titanium oxide films are treated by hydrogen sulfide or reducing atmospheres at high temperatures that such a film becomes electrically conducting. Accordingly, such a titanium oxide coating becomes electrically conducting when a luminescent screen is applied according to the procedure herein disclosed.

It is to be understood that the forms of the invention disclosed herein are to be taken as the preferred embodiments thereof, and that various changes in the shape, size and arrangement of parts as well as various procedural changes may be resorted to without departing from the spirit of the invention or the scope of the following claims.

I claim:

1. An electrically conducting glass unit comprising, a transparent electrically conducting film of tin oxide on a glass sheet, and a transparent protective coating consisting essentially of chromium oxide on the exposed surface of said tin oxide film.

2. A luminescent glass unit comprising, a sheet of glass, a transparent electrically conducting film of tin oxide on a surface of said sheet, a transparent coating of a sulfide resistant material over said first mentioned film, and a luminescent screen consisting of a sulfide of a material selected from the class consisting of zinc and cadmium over said film and coating.

3. A glass unit as defined in claim 2 in which the coating of sulfide resistant material is a chromium oxide.

4. A glass unit as defined in claim 2 in which the coating of sulfide resistant material is a titanium oxide.

5. A glass unit as defined in claim 2 in which the luminescent screen is zinc sulfide.

6. A glass unit as defined in claim 2 in which the luminescent screen is cadmium sulfide.

7. A method of making an electroluminescent unit which comprises the steps of, subjecting a glass surface, while it is at a temperature approximating the softening point of glass, to a tin compound to produce a tin oxide film thereon, subjecting the tin oxide film, while it is at a temperature approximating the softening point of glass, to a halide of one of the elements of the class consisting of silicon, titanium and chromium to produce a sulfide resistant coating thereon, depositing on the sulfide resistant coating a sulfide film containing as a combined constituent a metal selected from the group consisting of zinc, cadmium and mixtures thereof.

8. A method of making an electrically conducting luminescent screen on a glass surface which comprises the steps of, subjecting said surface, while it is at a temperature approximating the softening point of glass, to a tin compound to produce a tin oxide film thereon, subjecting the tin oxide film, while it is at a temperature approximating the softening point of glass, to the chemical action of a solution of titanium tetrachloride, and depositing on the sulfide resistant coating a sulfide film containing as a combined constituent a metal selected from the group consisting of zinc, cadmium and mixtures thereof.

9. A method of making an electrically conducting luminescent screen on a glass surface which comprises the steps of, subjecting said surface, while it is at a temperature approximating the softening point of glass, to a tin compound to produce a tin oxide film thereon, subjecting the tin oxide film, while it is at a temperature approximating the softening point of glass, to the chemical action of a solution of chromium oxychloride in acetic acid, and depositing on the sulfide resistant coating a sulfide film containing as a combined constituent metal selected from the group consisting of zinc, cadmium and mixtures thereof.

10. A method of making an electrically conducting luminescent screen on a glass surface which comprises the steps of, subjecting said surface, while it is at a temperature approximating the softening point of glass, to the chemical action of a solution of chromium oxychloride in acetic acid, and depositing on the sulfide resistant coating a sulfide film containing as a combined constituent metal selected from the group consisting of zinc, cadmium and mixtures thereof.

11. In a method of producing an electroluminescent lighting unit which includes a sheet of glass, a transparent electrically conducting coating on one surface of said glass sheet and a luminescent screen including a sulfide over said transparent electrically conducting coating, the steps of applying a transparent sulfide resisting coating consisting essentially of an oxide of one of the elements of the class consisting of silicate, titanium and chromium on said transparent electrically conducting film and then applying said luminescent screen over said sulphide resisting coating.

References Cited in the file of this patent

UNITED STATES PATENTS

| | | |
|---|---|---|
| 2,564,677 | Davis | Aug. 21, 1951 |
| 2,566,349 | Mager | Sept. 4, 1951 |
| 2,648,753 | Lytle | Aug. 11, 1953 |
| 2,685,530 | Cusano et al. | Aug. 3, 1954 |
| 2,732,313 | Cusano et al. | Jan. 24, 1956 |

UNITED STATES PATENT OFFICE
CERTIFICATE OF CORRECTION

Patent No. 2,919,212                                December 29, 1959

Romey A. Gaiser

It is hereby certified that error appears in the printed specification of the above numbered patent requiring correction and that the said Letters Patent should read as corrected below.

Column 3, line 69, for "hydrogen solenide" read -- hydrogen selenide --.

Signed and sealed this 31st day of May 1960.

(SEAL)
Attest:

KARL H. AXLINE
Attesting Officer

ROBERT C. WATSON
Commissioner of Patents